US00RE35809E

United States Patent [19]

Akagiri

[11] E Patent Number: Re. 35,809

[45] Reissued Date of Patent: May 26, 1998

[54] DIGITAL SIGNAL ENCODING WITH QUANTIZING BASED ON MASKING FROM MULTIPLE FREQUENCY BANDS

[75] Inventor: Kenzo Akagiri, Kanagawa, Japan

[73] Assignee: Sony Corporation, Tokyo, Japan

[21] Appl. No.: 94,944

[22] Filed: Jul. 20, 1993

Related U.S. Patent Documents

Reissue of:

[64] Patent No.: 5,157,760
Issued: Oct. 20, 1992
Appl. No.: 685,745
Filed: Apr. 16, 1991

[30] Foreign Application Priority Data

Apr. 20, 1990 [JP] Japan ..... 1-103045

[51] Int. Cl.[6] ..... G10L 9/18; G10L 9/00

[52] U.S. Cl. ..... 395/2.36; 395/2.14; 395/2.39

[58] Field of Search ..... 395/2, 2.35, 2.36, 395/2.37, 2.38, 2.39, 2.14; 381/29–50, 71, 94

[56] References Cited

U.S. PATENT DOCUMENTS

| | | | |
|---|---|---|---|
| 4,140,876 | 2/1979 | Gagnon | 395/2.36 |
| 4,455,649 | 6/1984 | Esteban et al. | 395/2.38 |
| 4,790,016 | 12/1988 | Mazor et al. | 381/36 |
| 4,811,404 | 3/1989 | Vilmur et al. | 395/2.36 |
| 4,932,063 | 6/1990 | Nakamura | 381/94 |
| 4,942,607 | 7/1990 | Schroder et al. | 395/2.36 |
| 5,109,417 | 4/1992 | Fielder et al. | 381/36 |
| 5,142,656 | 8/1992 | Fielder et al. | 381/37 |
| 5,157,489 | 10/1992 | Lowe | 358/133 |

FOREIGN PATENT DOCUMENTS

WO-A-8911759 11/1989 WIPO .

OTHER PUBLICATIONS

Boll, "Suppression of Acoustic Noise in Speech Using Spectral Subtraction", IEEE Trans. on ASSP, vol. ASSP-27, No. 2, Apr. 1979.

Davidson et al., "High Quality Audio Transform Coding at 128 K bits/s," Proceedings of International Acoustics, Speech and Signal Processing, Albuquerque, N.M., Apr. 1990 (Reprinted as Publication No. S90/8873, Dolby Technical Papers).

Johnston, "Transform Coding of Audio Signals Using Perceptual Noise Criteria", IEEE Journal on Selected Areas in Communication, vol. 6, No. 2, Feb. 1988, pp. 314–323.

Krahé, "Ein Verfahren zur Datenreduktion bei digitalen Audiosignalen unter Ausnutzung Psychoakustischer Phänomene," Rundfunktechnische Mitteilungen, vol. 30, No. H3, 1986, pp. 117–123.

Crochiere, "On the Design of Sub-band Coders for Low-Bit-Rate Speech Communication", Bell System Technical Journal, vol. 56, No. 5, May 1977, pp. 747–769.

*Primary Examiner*—David D. Knepper
*Attorney, Agent, or Firm*—William S. Frommer; Alvin Sinderbrand

[57] ABSTRACT

An allowable noise level is set for each frequency band of the input digital signal on the basis of the energy level of the respective frequency band and that of another frequency band. The energy level and the allowable noise level are non-linearly related so as to enable high data compression and to provide a satisfactory sound. The signal components of each of the frequency bands are quantized with a number of bits which correspond to the difference between the energy level of each frequency band and the allowable noise level. If the input digital signal is preemphasized, the signal is corrected for preemphasis prior to the setting of the allowable noise level, so that the quantization is performed on a signal which is free from the effects of preemphasis.

20 Claims, 7 Drawing Sheets

DIGITAL SIGNAL ENCODING WITH QUANTIZING BASED ON MASKING FROM MULTIPLE FREQUENCY BANDS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a digital signal encoding apparatus for encoding digital signals, such as digital audio or voice signals.

2. Description of the Prior Art

In high efficiency encoding of audio or voice signals in the prior art, input audio or voice signals are divided on a time axis or on a frequency axis into a plurality of channels and the associated bits are adaptively allocated to the respective channels. Examples of encoding techniques of audio signals by such bit allocation include sub-band coding (SBC) in which the audio signals on a time axis are divided into a plurality of frequency bands for encoding, adaptive transform coding (ATC) in which signals on a time axis are converted into signals on a frequency axis by orthogonal conversion and divided into a plurality of frequency bands which are then adaptively encoded, and a so-called adaptive bit coding (APC-AB) in which the SBC and ATC encoding techniques are combined so that the signals on a time axis are divided into frequency bands whereupon the signals of the respective bands are converted into baseband signals (low-range signals) and predictively encoded by n'th order linear predictive analyses, where n is an integer equal to or greater than two.

In the above-described high efficiency techniques, adaptive encoding on a band-by-band basis is typically performed by calculating the energy or the in-band peak value from ne band to another and then quantizing the components in each band with the number of bits allocated in accordance with the thus calculated respective energy.

Recently, in encoding audio signals, there is an increasing demand towards higher bits compression which is more satisfactory to a human's auditory sense than that achieved with the above mentioned conventional high efficiency encoding. As a result, it has been desired to perform encoding with higher data compression or bit compression which is more acceptable to the human auditory sense which considers the characteristics of the input audio signals or the human auditory sense.

In general, audio signals are known to have a relatively lesser amount of energy in the higher frequency components. For this reason, input audio signals are processed by pre-emphasis in advance of the encoding so as to equivalently decrease the high range noise with respect to the signal components thereby improving the signal-to-noise (S/N) ratio. In this case, deemphasis is performed during signal reproduction.

Thus, in encoding the audio signals which are to be divided into frequency bands, pre-emphasis and deemphasis are performed with quantization in which, as previously described, the number of bits are adaptively allocated to each of the frequency bands. More specifically, digital audio signals are processed by pre-emphasis and subsequently divided into a plurality of frequency bands. The signal components of each band are then quantized with the number of bits allocated in accordance with the energy of the respective frequency band. In this situation, the arithmetic operation for finding the energy in each frequency band is performed on signals which have already been processed by pre-emphasis.

As is to be appreciated, the number of quantization bits allocated on the basis of the energy of signals already processed by pre-emphasis may not be equivalent to the number of bits allocated on the basis of the properties of the actual input audio signals preceding the pre-emphasis. Thus, there is a substantial risk that the decoded audio or voice signals which are reproduced will be perceived by a human's auditory sense as being different from the original inputted signals.

OBJECT AND SUMMARY OF THE INVENTION

Accordingly, it is an object of the present invention to provide a digital signal encoding apparatus which avoids the above-mentioned disadvantages of the prior art.

More specifically, it is an object of the present invention to provide a digital signal encoding apparatus in which relatively high bit compression which is more appealing to the human auditory sense may be achieved and in which the quantization of the signal components with the number of bits adaptively allocated in accordance with the properties of the actual input audio signals may be performed without being affected by pre-emphasis.

According to an aspect of the present invention, a digital signal encoding apparatus for encoding a digital signal comprises dividing means for receiving the digital signal and for dividing the digital signal into a plurality of frequency bands having respective energy levels, noise level setting means for generating an allowable noise level for each of the frequency bands based on the energy level of the respective frequency band and the energy level of another of the frequency bands in which each of the allowable noise levels is non-linearly related to the energy level of the respective frequency band and quantization means for quantizing components of each of the frequency bands with a respective number of bits corresponding to a respective difference between the energy level of each of the frequency bands and the respective allowable noise level from the noise level setting means.

As explained in more detail hereinafter, the input digital signals are processed by pre-emphasis and the signals supplied to the noise level setting means are corrected for pre-emphasis.

According to the present invention, the number of bits utilized for quantization, which considers the characteristics of the human auditory sense, may be obtained from a non-linear relationship between the respective energy level and the allowable noise level on a band-by-band basis. Further, since the allowable noise level is generated on the basis of a signal which has been corrected for pre-emphasis, the number of quantization bits utilized to conform to the properties of the input digital signals before pre-emphasis may be obtained.

The above, and other objects, features and advantages of the present invention, will be apparent in the following detailed description of a preferred embodiment of the present invention when read in conjunction with the accompanying drawings in which corresponding parts are identified by the same reference numerals.

DESCRIPTION OF THE PREFERRED EMBODIMENT

An illustrative embodiment of the present invention will now be explained in detail with reference to the drawings.

Figure 1:
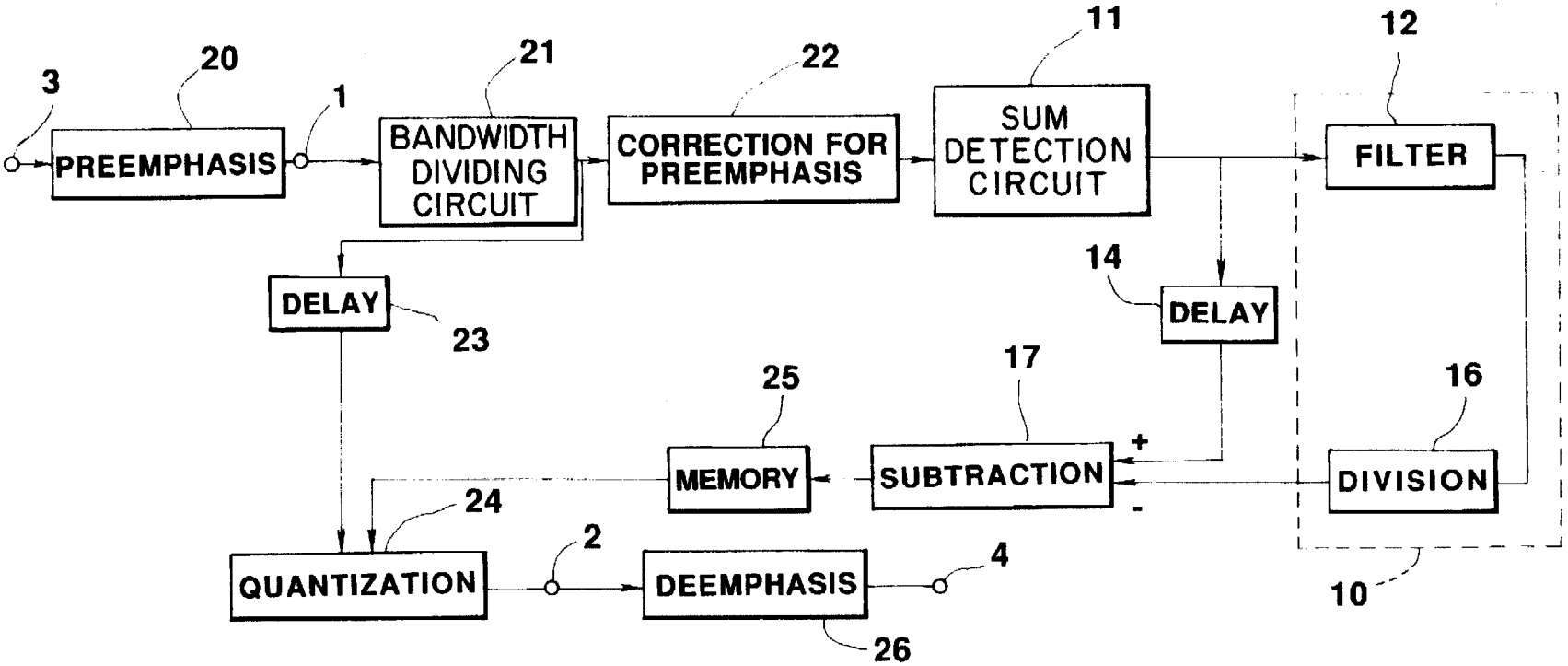
FIG. 1 is a block circuit diagram of a digital signal encoding apparatus according to an embodiment of the present invention.

A digital signal encoding apparatus according to an embodiment of the present invention is shown in block diagram form in FIG. 1. As shown in FIG. 1, the digital signal encoding apparatus generally includes a bandwidth dividing circuit 21 for dividing input digital signals supplied from an input terminal 1 into a plurality of frequency bands, a sum detection circuit 11, an allowable noise setting circuit 10 for setting or generating an allowable noise level based on the energy of each frequency band on a band-by-band basis as hereinafter more fully described, and a quantization circuit 24 for quantizing the components of each frequency band with the number of bits corresponding to the difference between the energy of each frequency band and the allowable noise level. More specifically, the noise level setting circuit 10 is adapted for setting the allowable noise level of a frequency band under consideration on the basis of the energy level of the frequency band under consideration and the energy level of another frequency band by utilizing a non-linear relationship between the allowable noise level and the energy level of each frequency band. The output signal of the quantization circuit 24 is supplied to an output terminal 2. When the input digital signal supplied to the input terminal 1 of the present apparatus is a pre-emphasized signal which, for example, may be supplied from a pre-emphasis circuit 20 which emphasizes a predetermined frequency component or components relative to other frequency component(s) of a digital signal supplied from an input terminal 3, the input digital signal is corrected for pre-emphasis by a pre-emphasis correction circuit 22 prior to being supplied to the allowable noise level setting means 10. As a result, in this situation, the output signal from the output terminal 2 is deemphasized by a deemphasis circuit 26 prior to being outputted at an output terminal 4.

The allowable noise level from the allowable noise level setting circuit 10 is set for each frequency band based upon characteristics of the human auditory sense, which include a so called masking effect. The masking effect is a phenomenon in which a certain sound is masked by another sound because of certain characteristics of the human auditory sense, thereby becoming inaudible. In other words, the masking effect is substantially equivalent to the masking of a certain sound or a frequency band of a signal B by another sound or another frequency band of a signal A. As a result, the level below a so-called masking level of the signal B is masked by the masking effect. The masking level changes in accordance with the level of the signal A and occasionally, depending on the level of the signal A, the signal B may be masked in its entirety. Since any noise below the masking level is masked and thereby inaudible, this masking level may be regarded as an allowable noise level. On the other hand, the signal level of signal A below the masking level is also masked under its own masking effect which changes in accordance with its signal level. The signal A is also influenced by the masking effect of the signal B.

Figure 2:
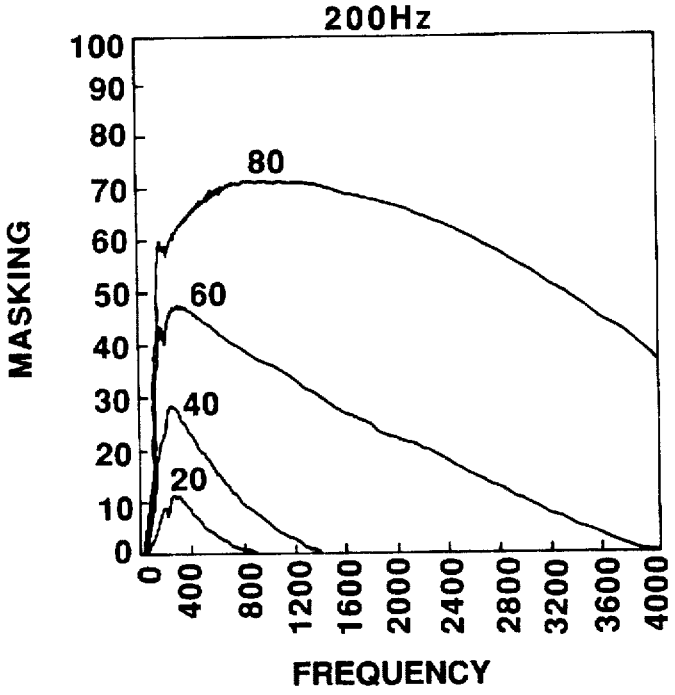
FIGS. 2 to 7 are charts illustrating the masking effect at various levels and frequencies.
Figure 3:
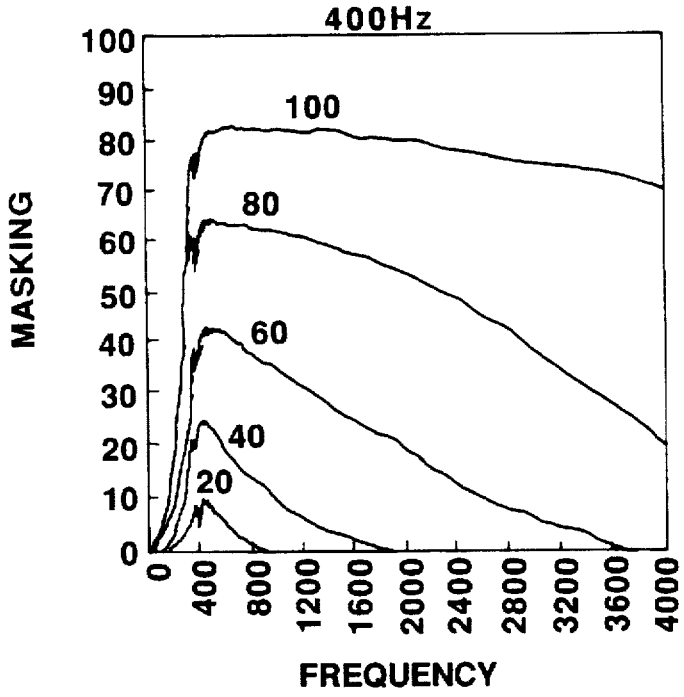
Figure 4:
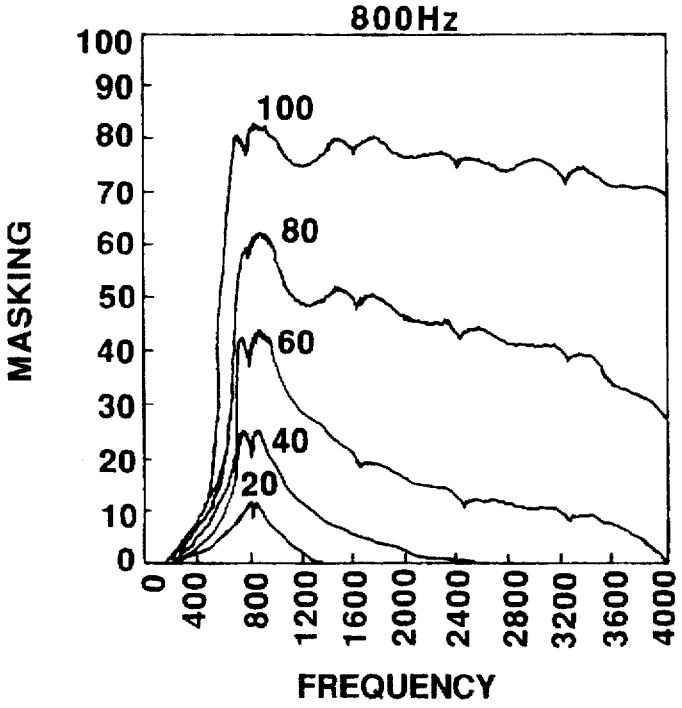
Figure 5:
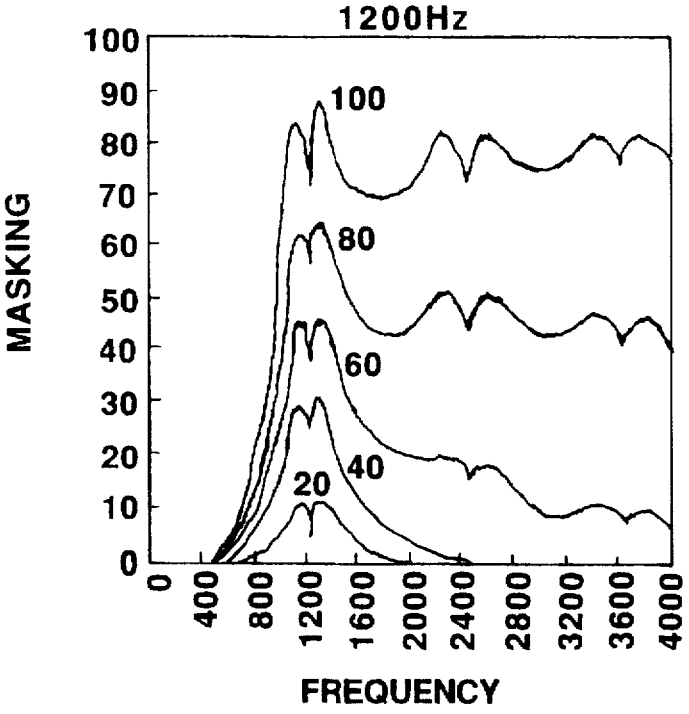
Figure 6:
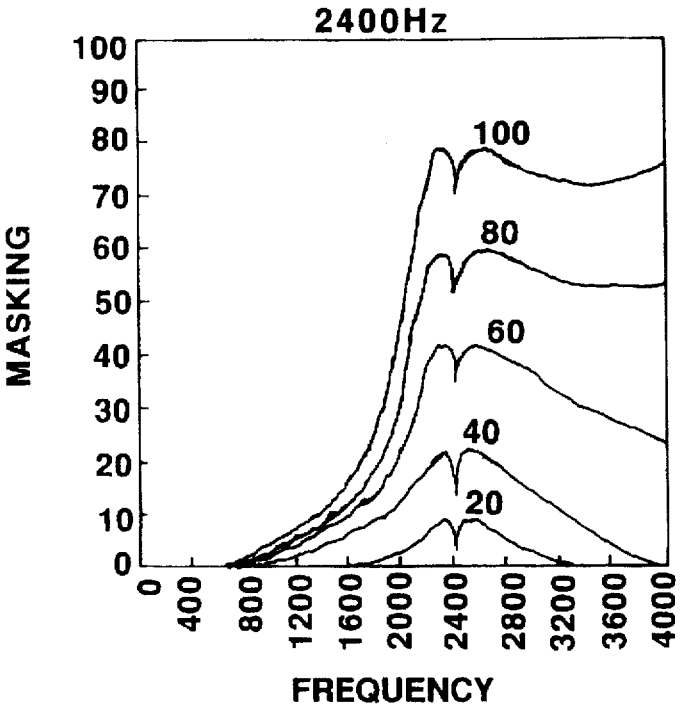
Figure 7:
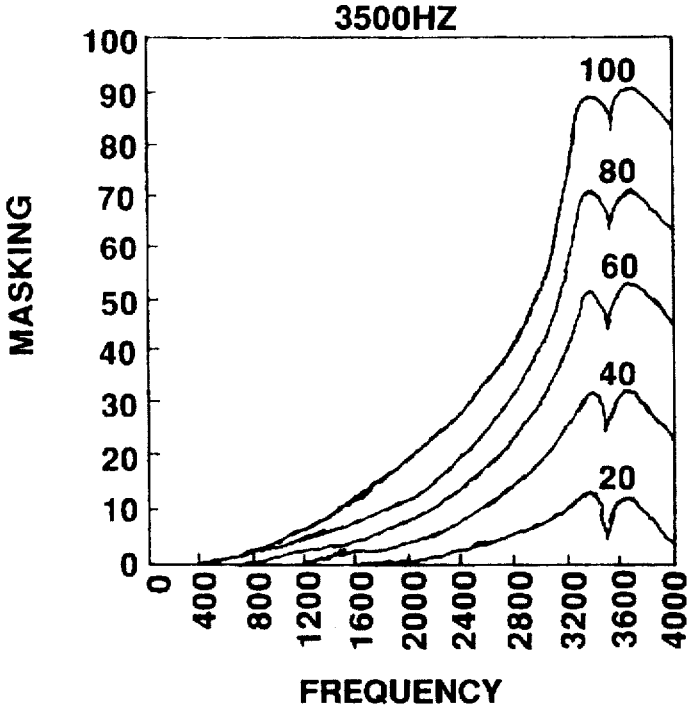

The masking effect normally has non-linear characteristics. As a result, when the signal level of the signal A increases n-fold, the masking range, that is, the operating range of the masking effect, is not increased n-fold, but is increased m-fold, where m is generally greater than n (m>n), so that the masking level or the masking quantity is raised. The masking range and the masking level also change with the frequency of the signal A. Typical changes in the masking range and the masking level due to changes in the signal level and the frequency may be observed from FIGS. 2–7. As shown therein, the masking quantity (dB) is plotted on the ordinate axis and the frequency (Hz) is plotted on the abscissa axis. More specifically, FIG. 2 shows an example of the masking quantity and the masking range for various levels of a 200 Hz signal. Similarly, FIGS. 3–7 illustrate examples of the masking quantity and the masking range for various signal levels of 400, 800, 1200, 2400 and 3500 Hz signals, respectively.

Thus, for a given arbitrary sound frequency spectrum A, the spectra adjacent thereto, such as the spectra B, C, D, . . . and so forth on both sides of the spectrum A, are partially masked and inaudible due to the masking effect. FIGS. 2 to 7 show the amount of masking of the frequency spectra B, C, D, . . . and so forth by the frequency spectrum A. For example, in FIG. 2, the effect of a signal having a frequency spectrum of 200 Hz on other signals having frequencies of 400 to 4000 Hz, that is, the masking quantity, is shown. For example, consider the situation in which a signal having a frequency spectrum A of 200 Hz has a level of 20 dB. As seen from FIG. 2, the masking quantity of a signal having a frequency spectrum of 400 Hz by the 20 dB 200 Hz signal is 9 dB. It is also seen from FIG. 2 that the 20 dB 200 Hz signal has substantially no masking effect on signals having frequencies of 1200 to 4000 Hz.

Thus, in the present apparatus, the allowable noise level of the frequency band under consideration is set in the allowable noise level setting circuit 10 on the basis of the masking level of the signal or energy level of the frequency band under consideration and the signal or energy level of another frequency band as hereinbefore described. Furthermore, the above mentioned non-linear characteristics of the masking effect are also taken into account in setting the allowable noise level of each frequency band.

Since the signal components in each frequency band which are below the allowable noise level, that is, the noise components, are masked, the number of bits allocated for quantization may be reduced by the number of bits corresponding to the signal components lying below the allowable noise level without adversely effecting the sound quality. Thus, in the present apparatus, signal components in each frequency band are quantized in the quantization circuit 24 with a number of bits which corresponds to the difference between the in-band signal or energy level and the allowable noise level. In this manner, the allocated number of quantization bits may be reduced thereby compressing the data. Also, a linear relationship between the energy level and the allowable noise level is adopted which takes the masking effect into account. More specifically, since the masking level increases non-linearly, as shown in FIGS. 2 to 7, then if the energy level of the frequency band under consideration is relatively large, the allocated number of quanitation bits in the frequency band under consideration and the other band may be further reduced thereby providing higher data compression. Hence, in the present embodiment, if the energy level in a frequency band is relatively high, then even despite the higher bit compression ratio, the reproduced sound heard by a person's ear is more appealing.

A more detailed description of the present apparatus and the operation thereof is now provided.

Figure 8:
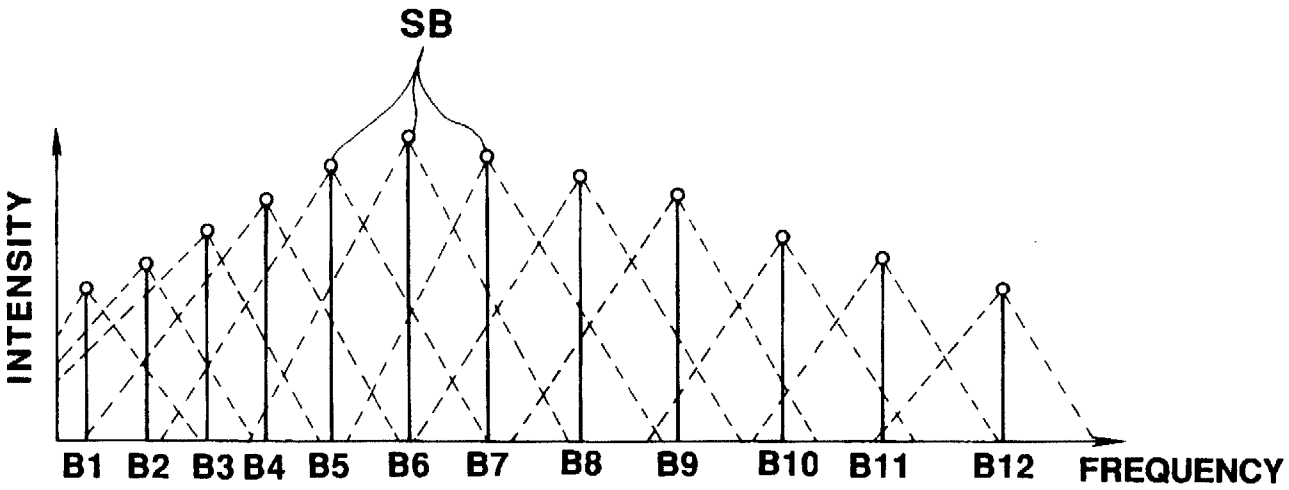
FIG. 8 is a chart showing the Burke spectrum.

Turning again to FIG. 1, digital audio signals are supplied through input terminal 1 to bandwidth dividing circuit 21, where the audio signals are divided into a plurality of frequency bands. In an example of a technique for performing such frequency division, the division is performed at the so-called critical bands which take into account the characteristics of the human auditory sense. More specifically, in this frequency division technique, the bandwidths are set broader as the frequency increases so as to take into account the characteristics of the human auditory sense. The signals of the frequency bands from the bandwidth dividing circuit 21 are supplied to a sum detection circuit 11 by way of a preemphasis correction circuit 22 which will be described later. In the sum detection circuit 11, the energy level for each frequency band, that is, the spectral intensity, is obtained by summing of the energies of each of the respective bands. The output of the sum detection circuit 11, that is, the sum spectrum of each band, is called the Burke spectrum. As an example, the Burke spectrum for each of 12 frequency bands is shown at SB in FIG. 8.

Figure 9:
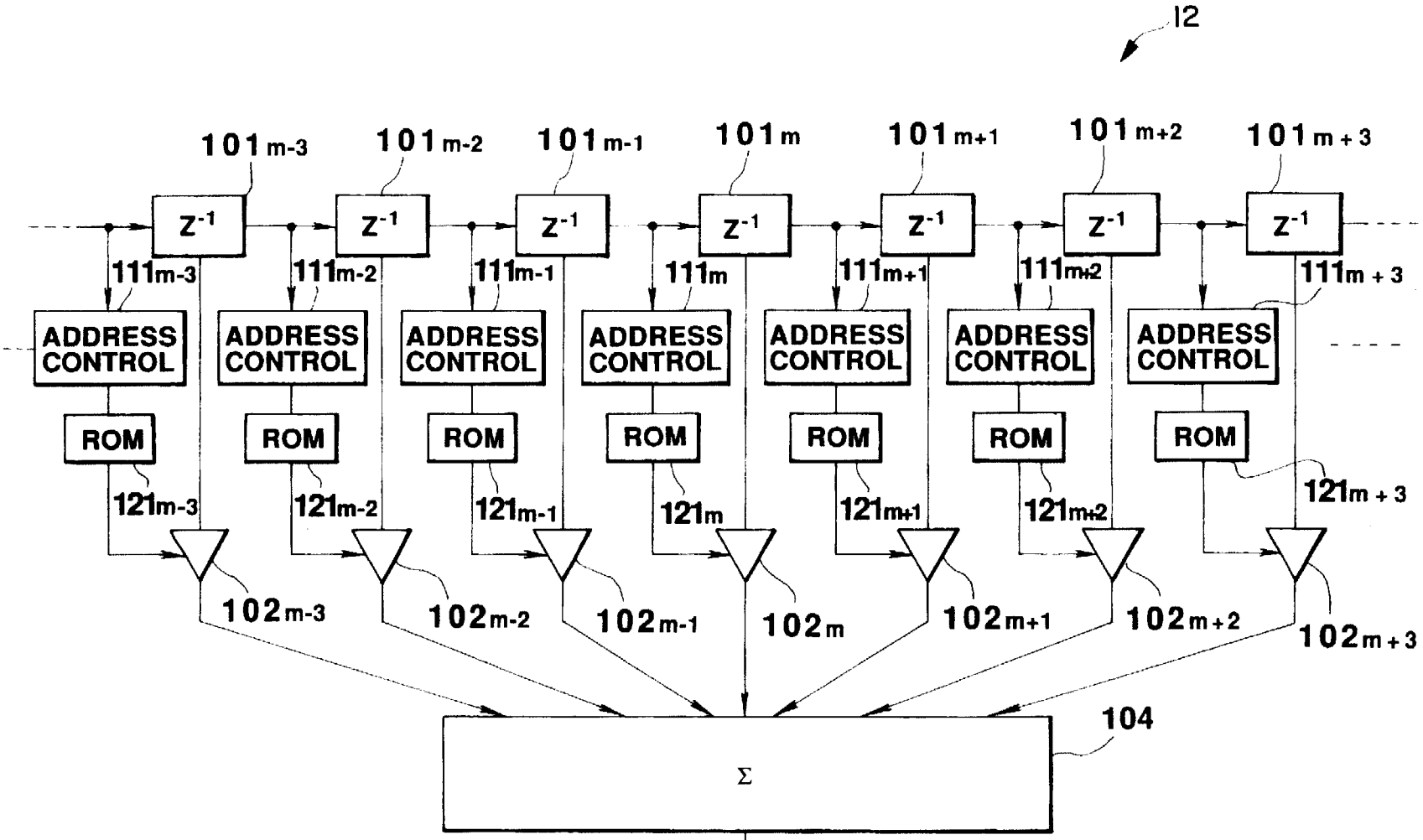
FIG. 9 is a block circuit diagram of a filter circuit.

To account for the effects of masking on the above-mentioned Burke spectrum SB, a predetermined weighing function is convolved on the Burke spectrum SB. More specifically, the outputs of the sum detection circuit 11, that is, the respective values of the Burke spectrum SB, are supplied to a filter circuit 12 of the allowable noise level setting circuit 10. As shown in FIG. 9, the filter circuit 12 includes delay elements $\mathbf{101}_{m-3}$ to $\mathbf{101}_{m+3}$ for sequentially delaying data from the sum detection circuit 11 by $Z^{-1}$, address control circuits $\mathbf{111}_{m-3}$ to $\mathbf{111}_{m+3}$ for detecting band numbers from the outputs of the delay elements and the levels of the bands and for generating address data on the basis of the detected results, ROM's $\mathbf{121}_{m-3}$ to $\mathbf{121}_{m+3}$ for storing filter coefficients, that is, the weighting functions, and from which the filter coefficients associated with the address data from the address control circuits $\mathbf{111}_{m-3}$ to $\mathbf{111}_{m+3}$ are read out, multipliers $\mathbf{102}_{m-3}$ to $\mathbf{102}_{m+3}$ for respectively multiplying the outputs of the delay elements $\mathbf{101}_{m-3}$ to $\mathbf{101}_{m+3}$ by the filter coefficients read out from the ROM's $\mathbf{121}_{m-3}$ to $\mathbf{121}_{m+3}$, and a summation unit or sum processor 104 for summing the outputs from the multipliers $\mathbf{102}_{m-3}$ to $\mathbf{102}_{m+3}$. That is, the outputs from the delay elements $\mathbf{101}_{m-3}$ to $\mathbf{101}_{m+3}$ are respectively multiplied by the filter coefficients read out from the ROM's $\mathbf{121}_{m-3}$ to $\mathbf{121}_{m+3}$ thereby performing a convolution of the Burke spectrum SB. From this convolution, the masking effects from adjacent Burke spectra are summed as indicated by the broken lines in FIG. 8. The masking effect of an arbitrary frequency spectrum a by other frequency spectra b, c, d, . . . and so forth act on the frequency spectrum a as a sum of the spectra b, c, d . . . and so forth.

Figure 10:
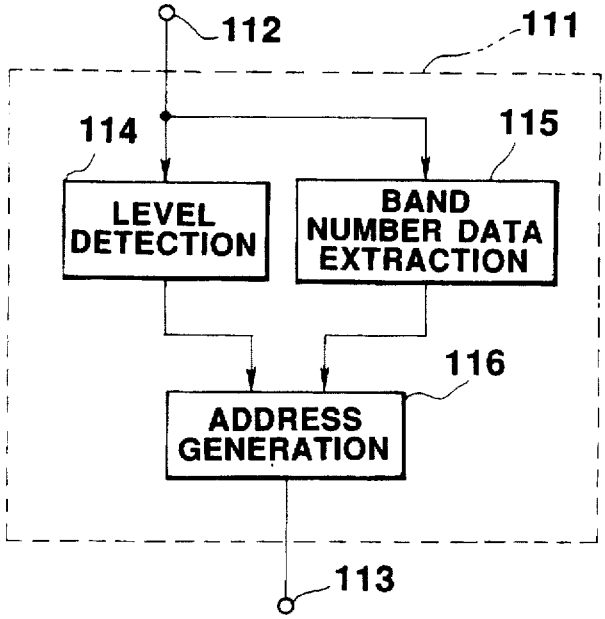
FIG. 10 is a block circuit diagram of an address control circuit.

FIG. 10 shows an arrangement of the address control circuit 111 in the filter circuit 12.

As shown therein, signals from the associated delay element 101 are supplied through a terminal 112 of the respective address control circuit 111 to a level detection circuit 114 and a band number data extraction circuit 115. In the level detection circuit 114, the level, that is, the peak level or mean level, of the band is detected. The band number data extraction circuit 115 extracts the band number data, that is, the data indicating to which band the supplied signal belongs. The outputs of circuits 114 and 115 are supplied to an address generating circuit 116, whereupon the associated address data are generated and supplied thorough a terminal 113 to the respective ROM 121 of the filter circuit 12. Since the masking effect differs with the frequency and the level as previously described and as shown in FIGS. 2–7, the extraction of the band order so that, the filter coefficients associated with the frequency and the level may be read out from the associated ROM 121.

The outputs from the filter circuit 12 is supplied to a division circuit 16 which is adapted to deconvolve the convolved data from the filter circuit 12. As a result of this deconvolution, the masking spectrum of the Burke spectrum SB, which is the allowable noise spectrum, is obtained from the output of the division circuit 16. Although deconvolution typically involves a relatively complicated processing operation, the present embodiment simplifies such deconvolution by using the division circuit 16.

Figure 11:
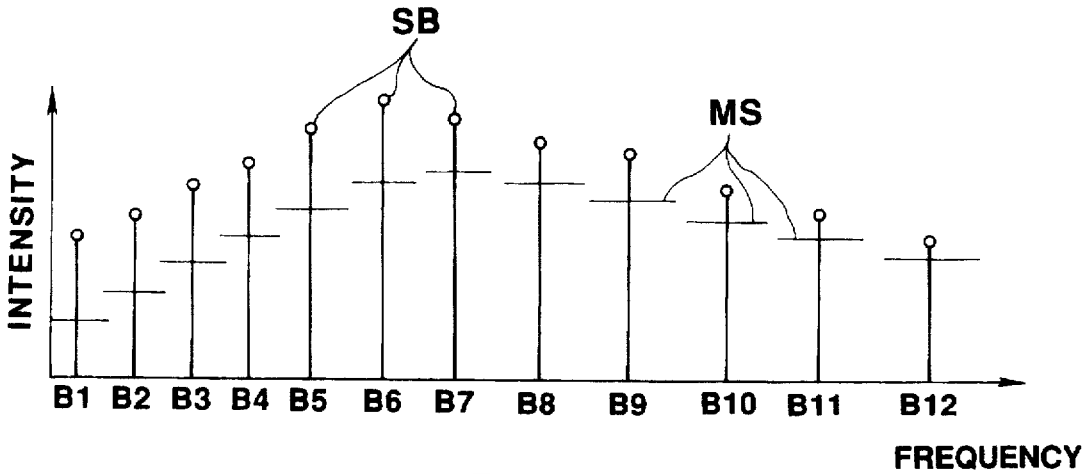
FIG. 11 is a chart showing a masking spectrum.

The masking spectrum is supplied to a subtracter 17 along with the output of the sum detection circuit 11, that is, the Burke spectrum SB, by way of a delay circuit 14. As a result, a subtraction operation is performed on the masking spectrum and the Burke spectrum SB by the subtracter 17, whereby, as shown in FIG. 11, the Burke spectrum SB is masked at a level which is typically lower than the level of the masking spectrum MS.

The output of the subtracter 17 is supplied to a quantization circuit 24 by way of a memory 25. The signal of each frequency band is also supplied to the quantization circuit 24 by way of a delay circuit 23, whereupon this signal is quantized on the basis of the bit number data read out from the memory 25. In other words, the signal components of each frequency band are quantized by the quantization circuit 24 in which the number of bits allocated for quantization correspond to the difference between the energy level of the respective frequency band and the masking spectrum MS (allowable noise level) obtained in the allowable noise level setting circuit 10 in consideration of the masking effect as previously described. The delay circuit 14 delays the Burke spectrum SB from the sum detection circuit 11 an amount corresponding to the processing time associated with the respective circuits upstream of the division circuit 16. Similarly, the delay circuit 23 provides a delay which corresponds to the processing time associated with the circuits upstream of the memory 25.

Since the energy level of the audio signals is relatively low in the high frequency range, as discussed above, predetermined frequency components of the input digital signals supplied to the input terminal 1 are emphasized, by way of a preemphasis operation, so as to equivalently decrease high frequency noise with respect to the signal components thus improving the S/N ratio. That is, the signals supplied to the input terminal 1 are preemphasized by the preemphasis circuit 20. As a result, in order to avoid the situation in which the allowable noise level from the allowable noise level setting circuit 10 is obtained from preemphasized signals, the signals supplied tot he allowable noise level setting circuit 10 are corrected by the preemphasis correction circuit 22. More specifically, if the input signals are preemphasized by the preemphasis circuit 20, the resulting outputted signals are deemphasized at the deemphasis circuit 22, whereupon signals corrected for preemphasis are outputted from the circuit 22. Thus, the situation in which the allowable noise level is set on preemphasized signals is avoided and, as a result, the signal components may be quantized with the respective number of bits which correspond to the properties of the actual input audio signals. As is to be appreciated, if the signals supplied to the input terminal 3 are not preemphasized, then the correcting operation is not performed at the preemphasis correction circuit 22.

Further, in the present embodiment, the audio signals which are represented on a time axis may be convened into signals which are represented on a frequency axis by Fourier transform processing at a predetermined time interval corresponding to a frame. The resulting FFT (Fast Fourier Transform) coefficient, composed of a real number component Re and an imaginary number component Im, may be further convened into data having an amplitude value Am and a phase value, in which the data of the amplitude value Am are transmitted as the input digital signals to the input terminal 1 or the input terminal 3. That is, since the human auditory sense is typically not active in sensing the phase in the frequency range, while, on the other hand, being acute to sensing the amplitude thereof, it is more meaningful to provide the latter as the input signals.

Furthermore, although a preferred embodiment of the present invention has been described in detail herein with reference to the accompanying drawings, it is to be understood that the invention is not limited to that precise embodiment, and that various changes and modifications can be effected therein by one skilled in the art without departing from the scope or spirit of the invention as defined in the appended claims.

I claim:

1. An apparatus for encoding a digital signal, comprising:

dividing means for receiving said digital signal and for dividing said digital signal into a plurality of frequency bands to produce a plurality of respective frequency band signals having respective energy levels, noise level setting means for generating an allowable noise level for each of said frequency band signals based on the energy level of the respective frequency band signal and the energy level of at least another one of said frequency band signals in which each of the allowable noise levels is non-linearly related to the energy level of the respective frequency band signal, means for producing a difference signal for each of said frequency band signals which represents a difference between the energy level of the respective frequency band signal and the allowable noise level for said respective frequency band signal, and quantization means for producing a quantized signal by quantizing components of each of said frequency band signals with a respective number of bits corresponding to the respective difference signal for each of said frequency band signals.

2. An apparatus for encoding a digital signal according to claim 1, wherein said dividing means divides said digital signal into said plurality of frequency bands having respective bandwidths in which each of said bandwidths is selected so as to increase in width as the frequency increases.

3. An apparatus for encoding a digital signal according to claim 2, wherein said quantization means includes memory means for receiving said difference signal and for generating said number of bits.

4. An apparatus for encoding a digital signal according to claim 2, further comprising pre-emphasis means for emphasizing predetermined components of said digital signal relative to other components and de-emphasis means for de-emphasizing said quantized signal, and wherein said dividing means receives said digital signal as pre-emphasized by said pre-emphasizing means.

5. An apparatus for encoding a digital signal according to claim 4, wherein said noise level setting means includes correcting means for correcting said plurality of frequency band signals produced by said dividing means so as to cancel any pre-emphasis effects produced by said pre-emphasis means.

*6. An apparatus for encoding a digital signal, comprising:*

*dividing means for receiving said digital signal and for dividing said digital signal into a plurality of frequency bands to produce a plurality of respective frequency band signals having respective energy levels,*

*noise level setting means for generating an allowable noise level for each of said frequency band signals based on the energy level of the respective frequency band signal,*

*means for producing a difference signal for each of said frequency band signals which represents a difference between the energy level of the respective frequency band signal and the allowable noise level for said respective frequency band signal, and*

*quantization means for producing a quantized signal by quantizing components of each of said frequency band signals with a respective number of bits corresponding to the respective difference signal for each of said frequency band signals.*

*7. An apparatus for encoding a digital signal according to claim 6, wherein said dividing means divides said digital signal into said plurality of frequency bands having respective bandwidths in which each of said bandwidths is selected so as to increase in width as the frequency increases.*

*8. An apparatus for encoding a digital signal according to claim 6, wherein said quantization means includes memory means for receiving said difference signal and for generating said number of bits.*

*9. An apparatus for encoding a digital signal according to claim 6, further comprising pre-emphasis means for emphasizing predetermined components of said digital signal relative to other components and de-emphasis means for de-emphasizing said quantized signal, and wherein said dividing means receives said digital signal as pre-emphasized by said pre-emphasis means.*

*10. An apparatus for encoding a digital signal according to claim 9, wherein said noise level setting means includes correcting means for correcting said plurality of frequency band signals produced by said dividing means so as to cancel any pre-emphasis effects produced by said pre-emphasis means.*

*11. An apparatus for encoding a digital signal, comprising:*

*dividing means for receiving said digital signal and for dividing said digital signal into a plurality of frequency bands to produce a plurality of respective frequency band signals having respective energy levels,*

*noise level setting means for generating an allowable noise level for each of said frequency band signals based on the energy level of the respective frequency band signal and the energy level of at least another one of said frequency band signals,*

*means for producing a difference signal for each of said frequency band signals which represents a difference between the energy level of the respective frequency band signal and the allowable noise level for said respective frequency band signal, and*

*quantization means for producing a quantized signal by quantizing components of each of said frequency band signals with a respective number of bits corresponding to the respective difference signal for each of said frequency band signals.*

*12. An apparatus for encoding a digital signal according to claim 11, wherein said dividing means divides said digital signal into said plurality of frequency bands having respective bandwidths in which each of said bandwidths is selected so as to increase in width as the frequency increases.*

*13. An apparatus for encoding a digital signal according to claim 11, wherein said quantization means includes memory means for receiving said difference signal and for generating said number of bits.*

*14. An apparatus for encoding a digital signal according to claim 11, further comprising pre-emphasis means for emphasizing pre-determined components of said digital signal relative to other components and de-emphasis means for de-emphasizing said quantized signal, and wherein said dividing means receives said digital signal as pre-emphasized by said pre-emphasis means.*

*15. An apparatus for encoding a digital signal according to claim 14, wherein said noise level setting means includes correcting means for correcting said plurality of frequency band signals produced by said dividing means so as to cancel any pre-emphasis effects produced by said pre-emphasis means.*

*16. An apparatus for encoding a digital signal, comprising:*

*dividing means for receiving said digital signal and for dividing said digital signal into a plurality of frequency bands to produce a plurality of respective frequency band signals having respective energy levels,*

*noise level setting means for generating an allowable noise level for each of said frequency band signals based on the energy level of the respective frequency band signal in which each of the allowable noise levels is non-linearly related to the energy level of the respective frequency band signal,*

*means for producing a difference signal for each of said frequency band signals which represents a difference between the energy level of the respective frequency band signal and the allowable noise level for said respective frequency band signal, and*

*quantization means for producing a quantized signal by quantizing components of each of said frequency band signals with a respective number of bits corresponding to the respective difference signal for each of said frequency band signals.*

*17. An apparatus for encoding a digital signal according to claim 16, wherein said dividing means divides said digital signal into said plurality of frequency bands having respective bandwidths in which each of said bandwidths is selected so as to increase in width as the frequency increases.*

*18. An apparatus for encoding a digital signal according to claim 16, wherein said quantization means includes memory means for receiving said difference signal and for generating said number of bits.*

*19. An apparatus for encoding a digital signal according to claim 16, further comprising pre-emphasis means for emphasizing predetermined components of said digital signal relative to other components and de-emphasis means for de-emphasizing said quantized signal, and wherein said dividing means receives said digital signal as pre-emphasized by said pre-emphasis means.*

*20. An apparatus for encoding a digital signal according to claim 19, wherein said noise level setting means includes correcting means for correcting said plurality of frequency band signals produced by said dividing means so as to cancel any pre-emphasis effects produced by said pre-emphasis means.*

* * * * *